United States Patent [19]

Polites

[11] Patent Number: 5,129,600
[45] Date of Patent: Jul. 14, 1992

[54] ROTATING-UNBALANCED-MASS DEVICES AND METHODS FOR SCANNING BALLOON-BORNE-EXPERIMENTS, FREE-FLYING SPACECRAFT, AND SPACE SHUTTLE/SPACE STATION ATTACHED EXPERIMENTS

[75] Inventor: Michael E. Polites, Huntsville, Ala.

[73] Assignee: The United States of America as represented by the Administrator of the National Aeronautics and Space Administration, Washington, D.C.

[21] Appl. No.: 527,462

[22] Filed: May 23, 1990

[51] Int. Cl.$^5$ .............................................. B64G 1/66
[52] U.S. Cl. ................................. 244/158 R; 74/61; 74/87; 343/766
[58] Field of Search ...................... 244/158 R–173, 244/1 R; 209/366.5, 367; 74/61, 87; 343/757–766; 404/500, 766

[56] References Cited

U.S. PATENT DOCUMENTS

| | | | |
|---|---|---|---|
| 1,116,124 | 11/1914 | Rojahn | 74/87 |
| 2,200,724 | 5/1940 | Robins | 74/61 |
| 3,625,074 | 12/1971 | Waschulewski et al. | 74/61 |
| 4,041,500 | 8/1977 | Lapp | 343/766 |
| 4,266,434 | 5/1981 | Burns | 74/87 |

Primary Examiner—Galen Barefoot
Attorney, Agent, or Firm—Robert L. Broad, Jr.; Jerry L. Seemann; John R. Manning

[57] ABSTRACT

A method and apparatus for scanning balloon-borne experiments, free-flying spacecraft, or gimballed experiments mounted on a space shuttle or space station, makes use of one or more rotating unbalanced mass devices for selectively generating circular, line, or raster scan patterns for the experiment line of sight. An auxiliary control system may also be used in combination with the rotating unbalanced mass device, for target acquisition, keeping the scan centered on the target, or for producing complementary motion for raster scanning. The rotating unbalanced mass makes use of a mass associated with a drive shaft, such mass having a center of gravity which is displaced from the drive shaft rotation axis. The drive shaft is driven with a substantially constant angular velocity, thereby resulting in relatively low power requirements since no acceleration or deceleration of the mass is generally involved during steady state operations. The resulting centrifugal force of the rotating unbalanced mass is used to generate desired reaction forces on the experiment or spacecraft to create a desired scan pattern for the experiment line of sight.

36 Claims, 4 Drawing Sheets

ROTATING-UNBALANCED-MASS DEVICES AND METHODS FOR SCANNING BALLOON-BORNE-EXPERIMENTS, FREE-FLYING SPACECRAFT, AND SPACE SHUTTLE/SPACE STATION ATTACHED EXPERIMENTS

ORIGIN OF THE INVENTION

The invention described herein was made by an employee of the U.S. Government and may be manufactured and used by or for the Government for Government purposes without the payment of any royalties thereon or therefor.

BACKGROUND OF THE INVENTION

The present invention generally concerns improvements in scanning experiments, and more particularly, in using a rotating unbalanced mass for controllably generating predetermined scan patterns for experiments supported on balloons, free-flying spacecraft, or space platforms like a space shuttle or space station.

Various support platforms have been previously used for receiving experiments. Examples of such are balloons, freeflying spacecraft, or a space shuttle or space station. Typically, a given experiment might be supported in a gimbal mount on a balloon, or a space shuttle or space station. Such arrangement permits movement of the experiment relative to the support platform. In other instances, such as for example in connection with a free-flying spacecraft, the experiment may be more directly or fixedly supported on the spacecraft for movement therewith.

Frequently, it is desired to cause the line of sight of a given experiment to be scanned in a predetermined scan pattern, such as a circular or line pattern. Such scanning may be necessary to meet scientific objectives of the experiment. Furthermore, the particular experiment itself will often dictate the type or nature of scanning required.

In some instances, it is necessary to physically move or manipulate the entire support platform, such as a free-flying spacecraft, in order to obtain or achieve the required scan motion for the supported experiment. Such is typical for example of X-ray and gamma-ray experiments on spacecraft. In other instances, such as where a gimbal mount or equivalent arrangement is utilized, the position of the experiment must be manipulated relative to its support.

Three general types of scan patterns are well-known and commonly utilized in various circumstances. The first is known as a circular scan, which means that the line of sight of the experiment (or a spacecraft) is repeatedly traced out in a circle, preferably centered on a desired target. The radius and period of the scan are typically controlled characteristics.

A second type of scan pattern commonly known and used is called the line scan, in which the experiment line of sight repeatedly moves back and forth in a line centered on a target. The amplitude of the line sweep is normally controlled as a desired characteristic, as is the orientation of the sweep line and the scan period. Similarly, the radius of a circular scan is typically a controlled characteristic.

A third form of scan pattern is called the raster scan, which is based on a line scan further complemented with some relatively slower motion in a direction generally perpendicular to the original line scan. Such complementary motion may be generated through stepping, a constant velocity (relatively slow velocity) movement component, or a saw-toothed movement component.

Prior art methods for achieving such various scan motions often are variously limited, or have practical drawbacks in connection with factors such as power, weight, cost, performance, stability, or combinations of such factors. Typically, the same system used for scanning is also used for target acquisition and centering, which is often very inefficient. Well-known examples of such prior methods available such as for scanning balloon-borne experiments are control moment gyroscopes (CMG's), reaction wheels, torque motors, or a combination of such devices. One particular drawback of the CMGs is their relative expense. Reaction wheels are likewise a potentially expensive approach, and have very inefficient power consumption. In other words, reaction wheels can require a great deal of power, particularly depending on the physical dimensions of the experiment and the characteristics of the desired scan motion (for example, amplitude and period of the scan motion).

One of the simplest of the prior art approaches is to use torque motors for scanning the experiment by torquing it against a gondola, the structure between the experiment and the flight train which attaches to the balloon. However, an inherent limitation is involved that unless the inertia of the gondola is relatively much larger than that of the experiment, then the gondola may move as much (or more than) the experiment. Another somewhat related disadvantage is that the gondola can become involved in rocking motion and/or pendulous oscillations by virtue of the dynamics of the gondola and the flight train. Such disturbances can in turn be fed back into the experiment being scanned, causing obvious and undesired disadvantages in performance and/or stability.

In connection with scanning experiments supported on free-flying spacecraft, prior methods typically use CMG's, reaction wheels, or a reaction control system (RCS). The drawbacks associated with CMG's and reaction wheels used in connection with free-flying spacecraft are generally the same as those described above in connection with their use with balloons. The problems relating to use of an RCS is that it is usually quite expensive. Even more protracted of a problem since a free-flying spacecraft is involved, is that the RCS may require a large amount of propellant, and hence a large amount of weight and space (both constituting payload problems), in order to be able to scan for relatively longer periods of time. Also, the on-off characteristics of an RCS are such that it is an impractical device where relatively precise scanning is desired (or necessary).

Generally the same types of prior scanning methods available for scanning experiments gimbal mounted on a balloon have been used for scanning experiments gimbal mounted on a space platform like a space shuttle or a space station. Accordingly, the problems discussed above in connection with such circumstances generally persist in the space shuttle or space station environment, with the following exception. The torque motor approach in connection with a space shuttle/station has available the relatively larger mass of the space shuttle or space station against which to provide torquing. Also, there is no flight train as in connection with the balloon to further complicate overall dynamics of the system. At the same time, such relative advantages over the balloon environment in connection with torque motors may be completely offset by particular performance or stability problems, such as caused by local structure flexibility of the space shuttle or space station, or by the large-amplitude/high-frequency reaction torques generated with torque motors.

SUMMARY OF THE INVENTION

The present invention recognizes and addresses various of the foregoing problems and others, concerning prior art scanning devices and methods. Thus, broadly speaking, a principal object of this invention is to provide improved method and apparatus for scanning inventions. More particularly, a main object is improved scanning method and apparatus usable in a variety of environments, such as for experiments carried on a balloon, a free-flying spacecraft, or a space platform like a space shuttle or a space station.

It is another general object of this invention to provide improved method and apparatus which achieves power, weight, cost, performance, and stability advantages over prior art scanning devices such as CMG's, reactions wheels, torque motors, RCS's, or various combinations thereof.

It is yet another general object of the present invention to provide improved method and apparatus which is equally applicable for alternately and selectively achieving circular or line scan patterns for the line of sight of an experiment. It is a more particular object to provide such improved method and apparatus which is further usable with auxiliary devices and methods for: (1) complementing the basic scan patterns produced by the invention, so as to achieve for example raster scan patterns and/or (2) acquiring and centering targets. The present invention and the auxiliary devices/methods combine synergistically.

It is another present general object to provide the foregoing improved method and apparatus which is readily usable with existing devices and technologies, further contributing to tremendous reduction in cost thereof.

It is a still further present object to provide method and apparatus which is flexible in providing desired scan patterns with different characteristics, such as selected and variable radius of circular scan patterns, and selected and variable amplitude of line scan patterns.

Similarly, it is a present more particular object to provide improved method and apparatus which readily achieves desired selection and variation in the period of respective scan patterns.

Additional objects and advantages of the invention are set forth, or will be apparent to those of ordinary skill in the art, from the detailed description which follows. Also, it should be appreciated that modifications and variations to the specifically illustrated and discussed features and methodologies hereof may be practiced in various embodiments and uses of this invention without departing from the spirit and scope thereof, by virtue of present reference thereto. Such variations may include, but are not limited to, substitution of equivalent means and features (materials) or steps and order of steps for those shown or discussed, and the functional or positional reversal of various parts, features, or method steps, or the like.

Still further, it is to be understood that different embodiments, as well as different presently preferred embodiments of the present invention, may include various combinations of presently disclosed features, steps, or their equivalents (including combinations of features and steps thereof not expressly shown or stated). One exemplary such embodiment of an apparatus in accordance with the present invention relates to apparatus for scanning experiments mounted on a support platform such as one of a balloon gondola, a free-flying spacecraft, and a space platform like a space shuttle or a space station. Such apparatus preferable includes drive means, a drive shaft, and a mass supported on such drive shaft. The drive means is preferably supported on an experiment mounted on the support platform, and adapted for rotatably driving a shaft at a substantially constant angular velocity. The drive shaft is associated with such drive means for being rotatably driven thereby about a rotation axis of such shaft. The mass is supported on the drive shaft for rotation therewith, and has a center of gravity which is displaced from the drive shaft rotation axis. A resulting rotating unbalanced mass is thereby formed upon operation of the drive means.

Another present exemplary embodiment concerns a device for controllably moving the line of sight of an experiment in a predetermined scan pattern, such experiment being supported on a given support platform. The device preferably comprises at least one rotatable unbalanced mass supported on a drive shaft and having a fixed axis of rotation relative to and associated with the experiment; and controllable drive means. Such drive means are for rotating the unbalanced mass about the shaft with a constant angular velocity. Predetermined reactions forces are thereby brought on the experiment so as to move its line of sight in a predetermined repeating scan pattern, without requiring acceleration or deceleration of the mass. With such an arrangement, the centrifugal force caused by rotation of the unbalanced mass creates a time-varying relatively large-amplitude/-high-frequency torque for producing the desired scan motion without relatively large power requirements.

Yet further embodiments of the present invention relate to various methodologies and processes, in accordance with the present invention, and alternatively making use of the foregoing exemplary constructions in accordance with this invention.

One such exemplary present method for scanning experiments mounted on a support platform includes the steps of: providing a rotatable drive shaft associated with an experiment, for being rotatably driven about a rotation axis of the shaft; providing a mass supported on such drive shaft for rotation therewith, which mass has a center of gravity displaced from the drive shaft rotation axis so that a resulting rotatable unbalanced mass is formed; and controllably rotating the drive shaft at a substantially constant angular velocity. Such operations generate reaction forces on the experiment which cause the line of sight of such experiment to be moved in a predetermined scan pattern.

In connection with the foregoing embodiments and exemplary methodologies, it is to be understood that more specific, present further alternative features of the invention result in the achievement of specific scan patterns (such as circular, line, or raster), having specific and controllable characteristics such as amplitudes and periods thereof. All such additional features will be discussed in greater detail below.

Furthermore, those of ordinary skill in the art will better appreciate all features and aspects of such embodiments, methods, and others, upon review of the remainder of the specification.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures, in which.

Figure 1:
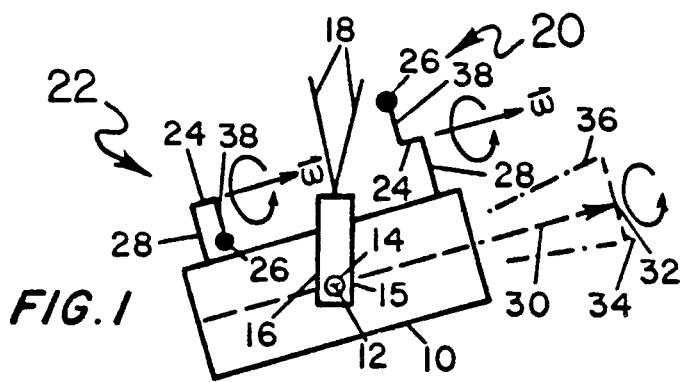
Figure 1 is a side diagrammatical view of a balloon-borne experiment being scanned in a circular pattern in accordance with this invention.

Repeat use of reference characters throughout the present specification and appended drawings is intended to represent same or analogous features, elements, or steps of the invention.

DETAILED DESCRIPTION OF THE PREFERRED EMBODIMENTS

Those of ordinary skill in the art will appreciate that the present invention in its broader aspects pertains to improved method and apparatus for scanning experiments. It should be equally well recognized that this invention is applicable to specific and alternative embodiments, such as practice of this invention with different support platforms, for example, balloons, free-flying spacecraft, and space shuttle/station. Accordingly, specific embodiments discussed herewith provide examples in each of such areas without limitation to broader aspects of this invention. Likewise, different scan patterns may be achieved, also discussed by way of the following examples. The illustrations in most of the accompanying drawings are highly diagrammatical for greater clarity and simplicity in discussing principles of this invention.

FIG. 1 illustrates a side diagrammatical view of a balloon-borne experiment 10 supported about its center of gravity 12 on elevation gimbal mount means 14 and cross-elevation gimbal mount 15 (hidden in this view) associated with the diagrammatical representation of balloon gondola 16. Shroud or parachute lines or cables 18 are likewise represented in diagrammatical fashion. Such experiment arrangements are well known to those of ordinary skill in the art, without further detailed explanation. Similarly, various gimbal mount arrangements are well known and may be practiced in concert with this invention, as may be various auxiliary means for controlling the position of experiment 10 relative gondola 16 through gimbal mount means 14 and 15. Such auxiliary controls, discussed more particularly below, are well known to those of ordinary skill in the art, for use such as for target acquisition, keeping a line of sight scan centered on a target, and for producing complementary motion for achieving special scan patterns such as raster scans.

Rotating unbalanced mass devices 20 and 22 are provided in accordance with this invention, and in accordance with present methodology are associated with experiment 10 for causing scanning thereof as discussed hereinafter. In general, such rotating unbalanced mass (RUM) devices each include a rotatable drive shaft 24 and mass member 26 supported thereon for rotation therewith. Such RUM devices are discussed in greater detail below with reference to present FIGS. 9 through 13.

In general, a mass is provided having a center of gravity which is displaced from the rotation axis of drive shaft 24 so that a resulting rotating unbalanced mass is formed upon rotation of such drive shaft. In highly diagrammatical form, a drive means 28 (such as a torque motor means or the like) is shown in FIG. 1 as being supported on experiment 10, and in turn adapted for rotatably driving drive shaft 24. In accordance with this invention, such drive shaft is preferably driven at a substantially constant angular velocity, which is important for the low power consumption achievement of scanning motions per the present methods.

Figure 2:
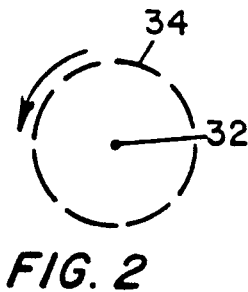
FIG. 2 is a diagrammatical end view of the resulting scan pattern from the embodiment of present FIG. 1.

Per further aspects of this invention whenever such is used in connection with a balloon-borne gimbal mounted experiment, a pair of RUM devices 20 and 22 are used for achieving desired scan patterns. In particular, such devices 20 and 22 are associated with experiment 10 such that the plane of rotation of such devices is parallel to one another (as shown by the angular velocity indications in FIG. 1). At the same time such planes of rotation are situated so that the line of sight 30 of the experiment is normal to such planes. Without operation of drive means 28, the experiment line of sight 30 would be pinpointed at a point 32, assuming one is considering a predetermined distance (see Figures 1 and 2). Upon operation of respective drive means 28 for rotation of the respective drive shafts 24, reaction forces created by masses 26 on gimbal mounted experiment 10 cause a circular scanning motion or pattern 34 of experiment line of sight 30. In effect, line of sight 30 itself travels in (or sweeps out) a cone-shaped pattern (generally 36).

The radius of circular pattern 34 is controllable and selected by the characteristics of the RUM devices 20 and 22. Methods and apparatus for both selecting and varying such are discussed below with reference to FIGS. 9 through 12. Those of ordinary skill in the art will appreciate that varying such radius of scan 34 during rotation of respective drive means 28 will result in a selected spiral scan pattern, which may be desired in certain circumstances. Otherwise, selection of the radius characteristics is performed in while drive means 28 are not operating, so that when drive means 28 is operative a circular scan of desired radius is achieved.

It is a further more particular aspect of the present methodology, and corresponding preferred apparatus that respective drive means 28 be operated for rotatably driving their respective shafts at a substantially constant angular velocity. In other words, once operative in steady state, it is desired that the angular velocity of masses 26 not be accelerated or decelerated. Such an arrangement, resulting in a time-varying relatively large-amplitude/high-frequency torque, has a very low power consumption requirement which is a tremendous advantage over certain prior art devices referenced above. In essence, only negligible friction and gravity influences need be overcome for continued revolution of the drive shaft and rotating unbalanced mass associated therewith.

In the embodiment of present FIG. 1, such RUM is, for example, a mass member 26 supported on a lever arm 38 being rotated preferably at a constant angular velocity. It should also be noted by those of ordinary skill in the art that, in addition to being controlled for preferably constant angular velocity, the relative angular positions of respective mass members 26 are maintained at a predetermined angular separation. Such predetermined angular separation is preferably about 180 degrees, as diagrammatically represented in present FIG. 1, for such particular configuration and practice of the invention. Other practices may make use of different separations (see, for example, discussion of FIG. 7).

In accordance with the present methodology and apparatus, the period of circular scan pattern 34 is directly associated with the period of rotation of RUM devices 20 and 22. Hence, control of the angular velocity of such devices results in direct control and selection of the period of circular scan 34 in accordance with this invention. Therefore, one wanting to have a shorter scan period need only operate respective drive means 28 for higher or faster angular velocity of respective drive shaft 24. Conversely, a relatively lower angular velocity can result in relatively longer desired circular scan periods. The ready selection and adjustment of such scan periods are further advantages of this invention. The radius of circular scan pattern 34 is directly related to the lengths of the lever arm 38. Hence, increasing the length of the lever arm 38 increases the radius of circular pattern 34, and visa versa.

Figure 3:
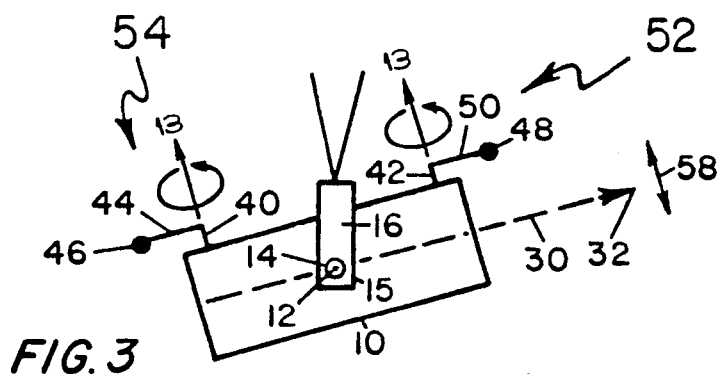
FIG. 3 is a side diagrammatical view of a balloon-borne experiment being scanned in a line/raster scan pattern in accordance with this invention.

FIG. 3 illustrates a present methodology and embodiment for producing a line scan for the line of sight of a balloon-borne experiment. The gimbal mount arrangement of present FIG. 1 is repeated in FIG. 3 and accordingly not described in the same detail. Drive means (not shown) are supported on experiment 10 for rotating respective drive shafts 40 and 42. Such drive shafts are situated with their respective rotation axes perpendicular to experiment line of sight 30. Drive shaft 40 is associated with a lever arm 44 and mass member 46, which is rotated in a plane parallel with line of sight 30, and parallel with the plane of rotation of mass member 48 supported on a lever arm 50 connected to drive shaft 42. Angular rotation is further indicated FIG. 3.

As in FIG. 1, resulting RUM devices 52 and 54 are situated on common sides of line of sight 30, and on opposite sides of center of gravity 12. The angular positions of mass members 46 and 48 are at a respective predetermined separation of preferably 180 degrees, as in the case with mass members 26 of RUM devices 20 and 22. RUM devices 52 and 54 are likewise preferably rotated at the same constant angular velocity, the selection of which determines the period of the line scan pattern in accordance with this invention. The selection of the length of the lever arms 44 and 50 determine the amplitude of the line scan.

Rotation of drive shafts 40 and 42 causes line of sight 30 to be displaced from its initial at rest point 32 into and out of the paper. Accordingly, such is not actually shown in the view of FIG. 3, but is represented by amplitude 56 of FIG. 4 (end view). Such amplitude is selectable in accordance with this invention, as discussed in greater detail with reference to FIGS. 9 through 12. Such amplitude selection is generally accomplished through establishment of the relationship of the rotating unbalanced mass to its respective drive shaft. The longer the length of the lever arms 44 and 50, the larger the scan amplitude.

Forming a raster scan with the arrangement of FIG. 3 results in deflection of line of sight 30 along a line in the direction of arrow 58 while the above discussed line scan is operating. Those of ordinary skill in the art will appreciate that various complementary motions, either of a stepping, constant velocity, or sawtoothed version, can be added to the line scan movement achieved with RUM devices 52 and 54, to create such an overall raster scan pattern for experiment 10 of FIG. 3. In particular, such raster scan may be accomplished through specific control of the relative position of experiment 10 versus gondola 16, effected through gimbal mount means 14 and 15, as understood by those of ordinary skill in the art without additional details.

Figure 4:
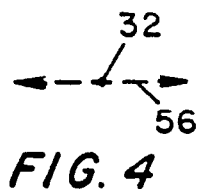
FIG. 4 is a diagrammatical end view of the resulting scan pattern from the embodiment of present FIG. 1.

FIG. 4 is a diagrammatical end view of line of sight 30 generating a line scan pattern in accordance with the embodiment in corresponding methodology related to present FIG. 3, and with a raster scan component of motion of amplitude 58 superimposed thereon. Those of ordinary skill in the art will appreciate that point 32 (in FIGS. 1 through 4) is for convenience in illustrating the resulting scan pattern of line of sight 30. In reality, the line of scan would continue more indefinitely, rather than truncating at a specific distance from experiment 10. Those of ordinary skill in the art will also appreciate that spiral scans and other particular scan patterns may be accomplished through variations and modifications to the invention disclosed herewith on a balloon-borne experiment.

Figure 5:
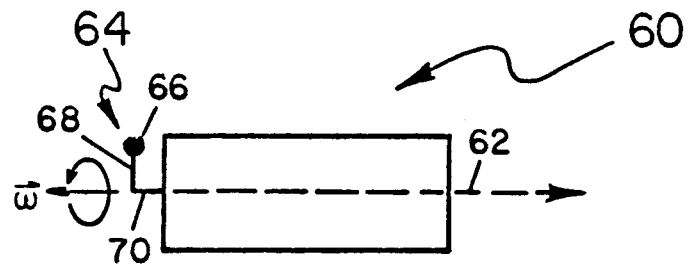
FIG. 5 is a side diagrammatical view of a free-flying spacecraft with experiment thereon being scanned in a circular scan pattern in accordance with this invention.
Figure 6:
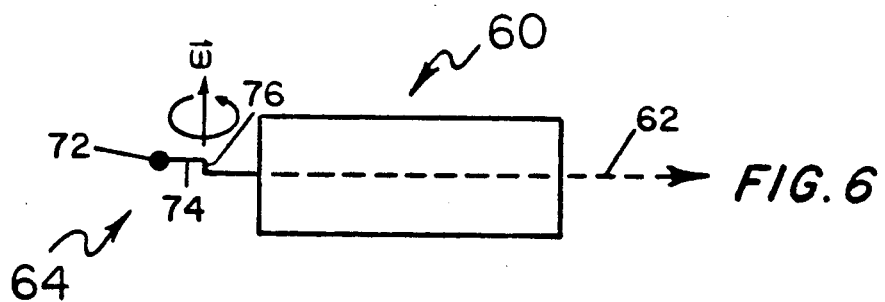
FIG. 6 is a side diagrammatical view of a free-flying spacecraft with experiment thereon being scanned in a line/raster scan pattern in accordance with this invention.

FIGS. 5 and 6 represent present embodiments and methodologies for practicing the present invention with a free-flying spacecraft 60. In connection with such spacecraft 60 or equivalent embodiments (or conditions), the experiment is generally and preferably fixedly mounted on spacecraft 60, rather than gimbal mounted thereto as discussed above with reference to balloon-borne experiments. Accordingly, though an experiment is not separately shown, a line of sight in direction of sight 62 is illustrated in both FIGS. 5 and 6 for an experiment carried on spacecraft 60. In each of the embodiments, a RUM device 64 in accordance with the present apparatus is supported on an end of spacecraft 60 opposite the aiming direction of line of scan 62.

The FIG. 5 configuration results in a circular scan, and includes support of RUM device 64 such that experiment line of sight 62 is normal (i.e., perpendicular) to the plane of rotation of mass member 66. Such mass member is received on an exemplary lever arm 68 which in turn is driven by a drive shaft 70. For clarity, the resulting circular scan of experiment line of sight 62 is not illustrated. However, those of ordinary skill in the art will appreciate that such circular scan would result in a cone-shaped pattern for line of sight 62, and having a certain radius at a selected distance from the front of the experiment, as in the case with the circular scan pattern of present FIGS. 1 and 2.

The functional differences between the configurations of 5 and 6 is that the FIG. 5 arrangement produces a circular scan for an experiment carried on a free-flying spacecraft, while the configuration and corresponding methodology of present FIG. 6 provides a line scan for an experiment carried on a free-flying spacecraft. Again, such line scan is itself not illustrated in FIG. 6 for the sake of clarity, but would be similar to a line scan pattern as formed in connection with present FIGS. 3 and 4. More particularly, the line scan pattern for the FIG. 6 arrangement would be formed by a line sweep of line of sight 62 moving with a rocking motion of spacecraft 60 so that the line moves in and out of the paper on which FIG. 6 is drawn.

As illustrated, in order to achieve such line scan in FIG. 6, the plane of rotation of mass member 72 is parallel with line of sight 62. Mass member 72 is supported on a lever arm 74 which is in turn driven by rotatable drive shaft 76, which is itself rotatably driven about its longitudinal rotation axis. Raster scanning can be accomplished through auxiliary control systems, as referenced above, for providing a stepping movement or other displacement of the spacecraft complementary to the line scan motion being produced with RUM device 64 in accordance with this invention. Those of ordinary skill in the art will also appreciate that spiral scans and other particular scan patterns may be accomplished through variations and modifications to the invention disclosed herewith, when using an experiment fixedly received on free-flying spacecraft.

It should likewise be appreciated that the present methodology and apparatus of FIGS. 5 and 6 functions so as to achieve actual displacement or movement of the entire spacecraft 60. Hence, such manipulation may be used for numerous desired purposes, not all of which would involve scanning experiments. For example, a scan pattern may be desired for facilitating a photographic survey or other multi-perspective observation. It could also be desired for such things as searching for communication signals with narrow beam receiving antennas, searching for the sun with small field of view sun sensors, or searching for guide stars with star trackers.

Figure 7:
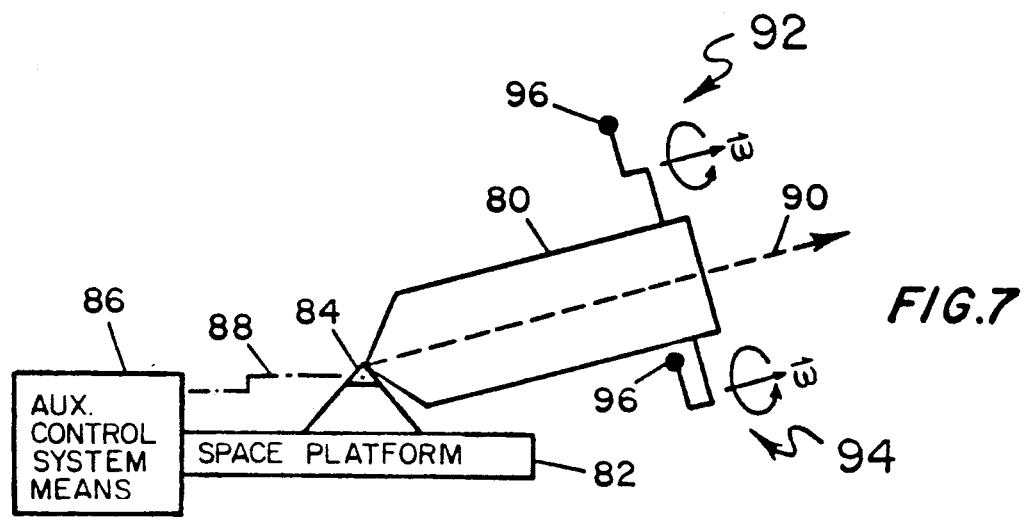
FIG. 7 is a side diagrammatical view of a space shuttle or space station with a gimbal-mounted experiment thereon being scanned in a circular scan pattern in accordance with this invention.
Figure 8:
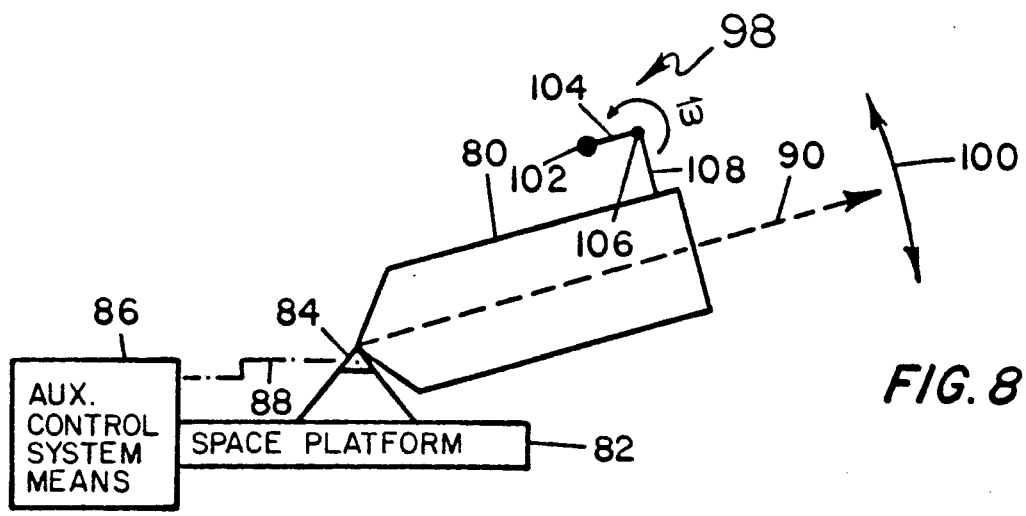
FIG. 8 is a side diagrammatical view of a space shuttle or space station with a gimbal-mounted experiment thereon being scanned in a line/raster scan pattern in accordance with this invention.

FIGS. 7 and 8 represent practice of the present invention in connection with an experiment 80 supported on a platform 82 like a space shuttle or station through gimbal mount means 84. As further understood by those of ordinary skill in the art, auxiliary control system means 86 are represented for controlling via control lines 88 the gimbal mount means 84. Such complementary control permits desired directing of experiment line of sight 90, whereby targets may be acquired and maintained. Also, particularly in connection with use of present RUM devices for creation of a line scan, auxiliary control system means 86 may be used for generating desired complementary positioning for achievement of a resulting raster scan pattern, or the like. It may also be used for centering the scan on the target.

FIG. 7 particularly illustrates practice of the present invention for generating a circular scan (not shown) of line of sight 90 for an experiment 80 gimbal mounted to a space platform 82. More particularly, a pair of RUM devices 92 and 94 in accordance with this invention are situated generally on an end of experiment 80 opposite gimbal means 84. Moreover, such RUM devices are on respective sides of line of sight 90. The plane of rotation of mass members 96 of each RUM device are respectively parallel. At the same time, line of sight 90 is perpendicular (i.e., normal) to such planes of rotation. It is generally desired that each of the RUM devices 92 and 94 be maintained at the same, constant angular velocity, as discussed above in connection with the devices 20 and 22 of FIGS. 1 and 52 and 54 of FIG. 3. However, as indicated in FIG. 7, respective masses 96 are controllably positioned so that their respective angular positions are in synchronism, rather than 180 degrees out of phase as in FIGS. 1 and 3.

Present FIG. 8 illustrates practice of the present invention for producing a line scan of line of sight 90 with operation of RUM device 98 associated with an experiment 80 gimbal mounted to a space platform 82. It is significant to note that the line scan pattern so formed is achieved with a single RUM device, instead of requiring a pair of RUM devices as illustrated in present FIGS. 1, 3, and 7. The resulting scan motion 100 is an oscillation of predetermined amplitude taking place in the plane of the paper in which the illustration of FIG. 8 is drawn.

Those of ordinary skill in the art will appreciate that a virtual condition of a single RUM device may be accomplished simply by not operating another RUM device supported on experiment 80. In other words, a RUM device positioned on experiment 80 in the position of device 94 of FIG. 7 simply "does not exist" (i.e., is transparent) in a force generation view of the system if the unbalanced mass is not being rotated.

RUM device 98 of exemplary FIG. 8 includes a mass member 102 supported on a lever arm 104 for rotation in the indicated direction about a drive shaft 106. Such drive shaft is situated normal to and displaced from line of sight 90. Such drive shaft 106 is also in a position normal to the plane of the paper in which FIG. 8 is drawn; hence, drive shaft 106 appears as a point in the illustration of FIG. 8 attached to lever arm 104 on one side thereof, and to a further interconnecting or support member 108 associated with experiment 80. Of course, such member 108 also diagrammatically represents a drive means or the like for rotatably driving support shaft 106. As indicated, the resulting plane of rotation of mass member 102 is in the same plane as oscillatory motion 100. Not represented in present FIG. 8 is the potential for raster scan patterns, which as those of ordinary skill in the art appreciate would be achievable through operation of auxiliary control system means 86 for varying the position of experiment 80 relative space platform 82.

Figure 9:
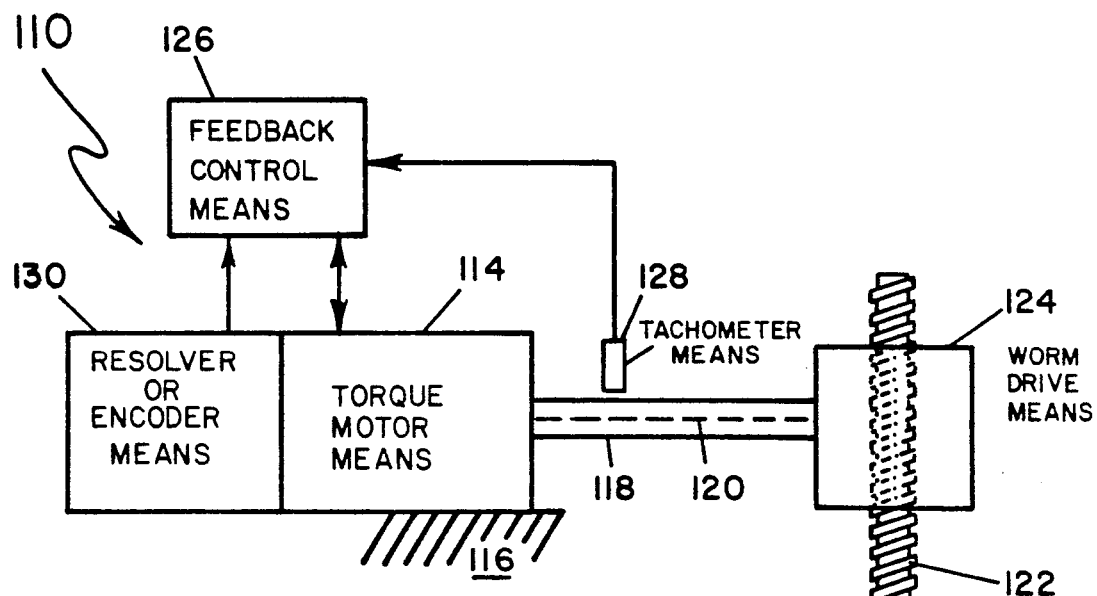
FIG. 9. is a diagrammatical view of one exemplary rotating unbalanced mass device in accordance with this invention.

FIG. 9 illustrates in greater diagrammatical detail an exemplary rotating unbalanced mass device 110 in accordance with this invention. Device 110 may be used in the various configurations as discussed above with reference to RUM devices 20, 22, 52, 54, 64, 92, or 98. Furthermore, the exact configuration thereof may be altered so that mass member 112 is rotated in different planes relative to the line of sight of a given experiment with which RUM device 110 is utilized.

In general, device 110 includes torque motor means 114 or equivalent drive means supported on an experiment 116 (or a spacecraft or the like) with which device 110 is utilized. Torque motor means 114 directly drives an output shaft 118 constituting a drive shaft in accordance with this invention. The longitudinal rotation axis of such shaft is represented by dotted line 120 in present FIG. 9.

Different alternative embodiments may be practiced in accordance with this invention for securement of a mass member to drive shaft 118. In present FIG. 9, mass member 112 is supported on a lever arm 122 which is in turn (directly or indirectly) rotatably driven by shaft 118. In the FIG. 9 embodiment, worm drive means 124 is provided for operatively interconnecting threaded lever arm 122 with output shaft 118. By such arrangement, the relative distance between mass member 112 and shaft 118 may be varied, during operation of torque motor means 114 or otherwise. The resulting changes in the overall characteristics of the rotating unbalance mass supported on shaft 118 changes the centrifugal force imparted to experiment or spacecraft 116. Such changes in turn cause different reaction forces resulting in corresponding controlled selection of the resulting radius of circular scan patterns or resulting amplitude of line scan patterns.

For example, in FIG. 9, if worm drive means 124 is driven so that mass member 112 is moved further away from shaft 118, a resulting radius of a circular scan pattern produced with RUM device 110 is enlarged. If mass 112 is instead moved through operation of worm drive means 124 so as to be closer to drive shaft 118, then the corresponding radius (or amplitude) of a circular scan (or line scan) is reduced. Another way of looking at such facet of the present invention is that changes in the position of the center of mass of the rotatable mass relative to the rotation axis of shaft 118 changes the unbalanced characteristics thereof, resulting in the above-noted changes in radius or amplitude characteristics of corresponding respective circular and line scan patterns.

The individual components illustrated in present FIG. 9 are generally well known and understood by those of ordinary skill in the art without detailed explanation thereof. For example, it is well known for a torque motor means such as 114 to be driven by feedback control means 126 which receives a signal from tachometer means 128 (concerning the angular velocity of shaft 118), and which receives angular position information from resolver or encoder means 130 (supplying angular position information regarding shaft 118). The tachometer is optional but should give better control of the angular velocity of shaft 118. Likewise, worm drives are well known, and may be variously controlled for repositioning lever arm 122 relative to shaft 118, as alluded to above.

Figure 10:
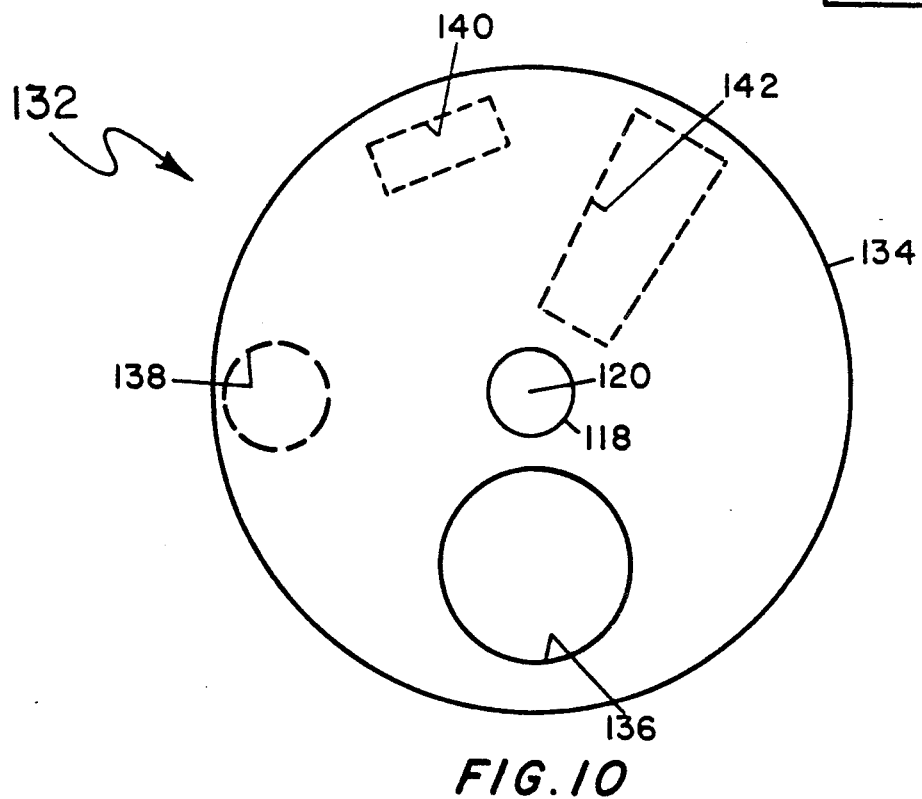
FIG. 10 is an end view of an exemplary mass member in accordance with an alternate embodiment of such for this invention.

FIG. 10 illustrates one alternative embodiment of a rotatable unbalanced mass 132 in accordance with this invention. Such mass preferably comprises a circular member 134 for securement to an output shaft 118 having a longitudinal rotation axis 120. It should be apparent from the orientation of shaft 118 and longitudinal axis 120 that FIG. 10 is a plan view of such a circular member 134.

Such member 134 may comprise a generally solid member or mass, such as of rubber, metal, or the like, with an off-center opening 136 defined therethrough so as to present an unbalanced mass to drive shaft 118. An alternate situs and size 138 for such off-center opening (i.e., use of 138 in place of opening 136) results in a different circular member having different unbalanced mass characteristics from the solid line illustration of 134. Such different circular member could be interchanged on drive shaft 118 with the original member, thereby changing radius characteristics of a resulting circular scan pattern or amplitude characteristics of a resulting line scan pattern.

Additionally, the nature of such openings 136 and 138 is not limited to circular openings, but may comprise other geometrical (or nongeometrical) shapes, such as openings 140 and 142 illustrated in dotted line in present FIG. 10. Also, those of ordinary skill in the art will appreciate that different forms of modifications and variations may be made to particular masses so as to create unbalanced characteristics for rotation thereof about a drive shaft 118 in accordance with this invention. All such modifications and variations are intended to come within the spirit and scope of the present invention by virtue of such reference thereto.

Figure 11:
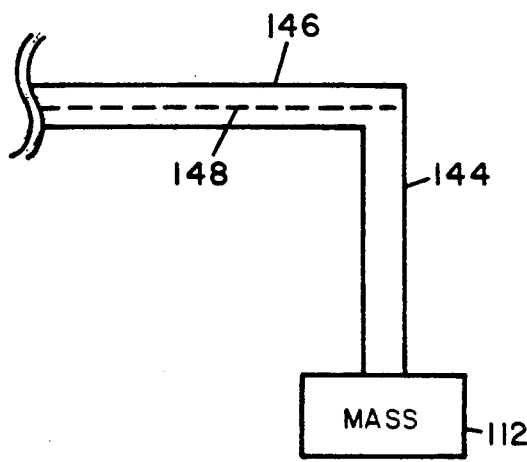
FIG. 11 is an alternate embodiment for mounting of a mass member in accordance with this invention.

Present FIG. 11 illustrates yet another exemplary embodiment of a rotatable unbalanced mass 112 in accordance with this invention. Such mass member 112 is disposed in a permanent right angle configuration on a lever arm 144 relative to a drive shaft 146. Such arrangements could be particularly advantageous where stability and precision are desired without any necessity of preserving the ability to change the amplitude of resulting line scans or the radius of resulting circular scans. Those of ordinary skill in the art will appreciate that drive shaft 146 is intended to be rotated about its rotational axis 148.

Figure 12:
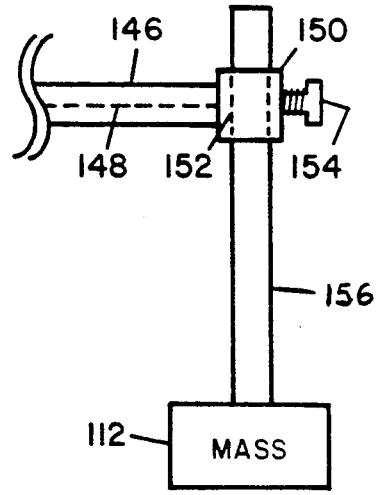
FIG. 12 is a still further alternate embodiment for mounting of a mass member in accordance with this invention.

FIG. 12 illustrates still another alternative embodiment of a rotatable unbalanced mass in accordance with this invention. In particular, an output shaft 146 having longitudinal rotation axis 148 has secured thereto and supported thereon attachment means 150 for rotation about axis 148. Such attachment means may comprise, for example, a member with a receiving channel 152 defined therein and set screw or equivalent 154. With lever arm 156 received in channel 152, set screw 154 (threadably received in an opening in member 150, not shown) may be tightened with mass 112 received in a desired location relative to shaft 146. Such arrangement offers greater simplicity than the FIG. 9 alternative embodiment, but at the same time still affords the ability to change circular scan radius characteristics or line scan amplitude characteristics. Such could be particular advantageous such as on a space shuttle or station, or a spacecraft arrangement, where it is desired to minimize the weight which must be carried into orbit.

Figure 13:
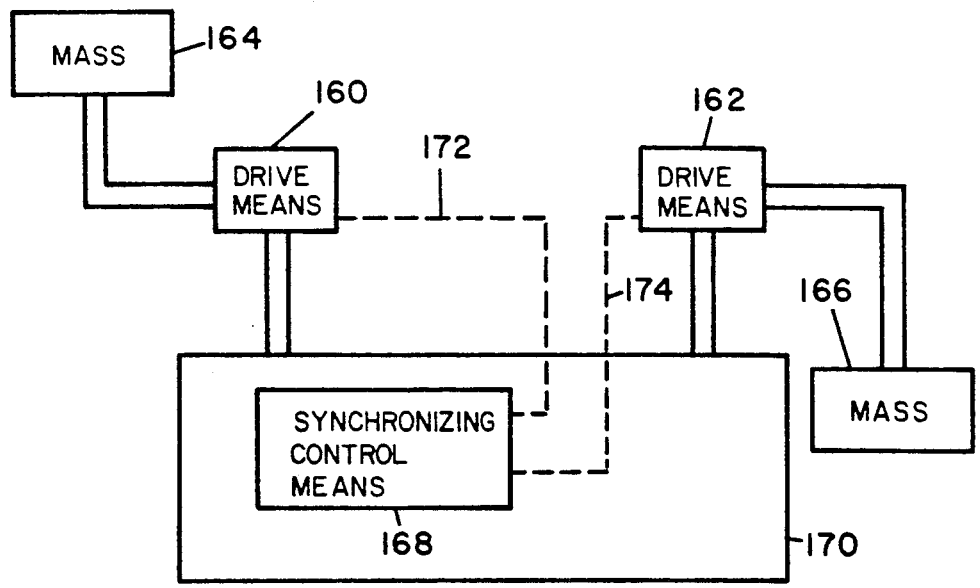
FIG. 13 is a diagrammatical view of synchronizing control means for use in accordance with this invention in connection with two (or more) drive means.

FIG. 13 illustrates in diagrammatical form greater details of an exemplary arrangement such as in present FIG. 1, wherein a pair of drive means 160 and 162 are used for rotating respective mass members 164 and 166. Again, preferably utilizing existing torque motor technology or its equivalents, synchronizing control means 168 (well known to those of ordinary skill in the art) is supported on an experiment or spacecraft 170 with drive means 160 and 162 for synchronously controlling such drive means via control lines 172 and 174. Preferably, tachometer means and resolver/encoder means as shown in FIG. 9 are also used with the drive means of present FIG. 13. With such available information, both drive means of FIG. 13 can be controlled by synchronizing control means 168 so that mass members 164 and 166 are rotated with the same, preselected constant angular velocity. At the same time synchronizing control means 168 can be used to insure a desired, predetermined angular degree of separation between the angular positions of the respective unbalanced centers of gravity driven by drive means 160 and 162. As illustrated diagrammatically in present FIG. 13, a 180 degrees separation may be desired for such a configuration. However, for other alternative configurations, such as in present FIG. 7, zero degrees angular separation is desired. In such instances synchronizing control means 168 can likewise be utilized for obtaining the desired angular separation.

Those of ordinary skill in the art will appreciate that the various modifications, variations, and alternatives discussed above with respective to the figures may be incorporated into other of the presently illustrated exemplary embodiments, and other embodiments of this invention not specifically illustrated or discussed. Such interchangeability is without prejudice as to both apparatus and present methodology.

What is claimed is:

1. Apparatus for scanning experiments mounted on a support platform said apparatus including
   drive means, supported on an experiment mounted on a support platform, and adapted for rotatably driving a shaft at a substantially constant angular velocity;
   a drive shaft associated with said drive means for being rotatably driven thereby about a rotation axis of said shaft;
   a mass supported on said drive shaft for rotation therewith, said mass having a center of gravity which is displaced from said drive shaft rotation axis so that a resulting rotating unbalanced mass is formed upon operation of said drive means; and
   wherein said experiment is gimbally mounted on said support platform, said apparatus being capable of imparting one of a predetermined circular scan pattern and a predetermined line scan pattern to said experiment.

2. Apparatus as in claim 1, wherein said drive means comprises a servo drive system.

3. Apparatus as in claim 2, wherein said servo drive system includes a torque motor, a feedback tachometer for sensing rotation speed of said drive shaft, resolver, or encoder means for sensing angular position of said drive shaft, and feedback control means responsive to said rotation speed and angular position sensing for controlling operation of said torque motor so that a substantially constant drive shaft angular velocity is achieved.

4. Apparatus as in claim 1, wherein said mass includes a lever arm secured at one end thereof to said drive shaft at some angle thereto, and a mass member secured to an opposite end thereof.

5. Apparatus as in claim 4, wherein said angle of securement is preferably about 90 degrees.

6. Apparatus as in claim 4, further including means for adjusting the distance between said mass member and said drive shaft.

7. Apparatus as in claim 1, wherein said mass includes a generally solid circular member secured to said drive shaft for rotation therewith, said circular member defining an off-center opening therethrough so as to present an unbalanced mass to said drive shaft.

8. Apparatus as in claim 7, wherein said circular member is removably secured to said drive shaft so as to be interchangeable with another circular member having different unbalanced mass characteristics.

9. Apparatus as in claim 1, wherein the line of sight of said experiment is normal to the plane of rotation of said mass.

10. Apparatus as in claim 1, wherein the line of sight of said experiment is parallel to the plane of rotation of said mass.

11. Apparatus as in claim 1, further including auxiliary control system means for adjusting the position of said support platform relative a target of said experiment.

12. Apparatus for scanning experiments gimbal mounted on a support platform, said apparatus including:
    a first drive means and a second drive means supported on an experiment gimbal mounted on a support platform,
    a first drive shaft driven by the first drive means and a second drive shaft driven by the second drive means, said drive shafts each being rotatably driven at a substantially constant angular velocity; and
    a first mass and a second mass supported on said first drive shaft and said second drive shaft respectively for rotation therewith, said masses each having a center of gravity which is displaced from said drive shaft rotation axis so that a resulting rotating unbalanced mass is formed upon operation of said first and second drive means.

13. Apparatus in claim 12, wherein the planes of rotation of said masses are parallel to each other, and the line of sight of said experiment is normal to said planes of rotation.

14. Apparatus as in claim 12, wherein the planes of rotation of said masses are parallel to each other, and the line of sight of said experiment is parallel to said planes of rotation.

15. Apparatus as in claim 12, further including synchronizing control means for operating said two drive means in synchronism.

16. Apparatus as in claim 12, further including auxiliary control system means associated with said gimbal mounted for adjusting the position of said experiment relative said experiment platform.

17. A device for controllably moving the line of sight of an experiment in a predetermined scan pattern, such experiment being supported on a given support platform, said device comprising:
    a first rotatable unbalanced mass and a second rotatable unbalanced mass supported on respective drive shafts having a fixed axis of rotation relative to and associated with the experiment;
    controllable drive means for rotating said first and second unbalanced masses about shafts with a constant angular velocity, so that predetermined reaction forces are brought on the experiment so as to move its line of sight in a predetermined, repeating scan pattern without requiring acceleration or deceleration of said mass, whereby the centrifugal force caused by rotation of said unbalanced mass creates a time-varying relatively large-amplitude/high frequency torque for producing the desired scan motion without relatively large power requirements;
    wherein the experiment is gimbal mounted on the support platform;

auxiliary control system means for controllably positioning said gimbal mount for producing target acquisition and retention, and for producing complementary motion to the predetermined scan pattern generated with rotation of said unbalanced mass; and wherein said axes of rotation for said drive shafts are parallel to the line of sight of the experiment and positioned on opposite sides of the center of gravity of such experiment for producing a predetermined circular scan pattern with the experiment line of sight.

18. A device for controllably moving the line of sight of an experiment in a predetermined scan pattern, such experiment being supported on a given support platform, said device comprising:

a first rotatable unbalanced mass and a second rotatable unbalanced mass supported on respective drive shafts having a fixed axis of rotation relative to and associated with the experiment;

controllable drive means for rotating said first and second unbalanced masses about said shafts with a constant angular velocity, so that predetermined reaction forces are brought on the experiment so as to move its line of sight in a predetermined, repeating scan pattern without requiring acceleration or deceleration of said mass, whereby the centrifugal force caused by rotation of said unbalanced mass creates a time-varying relatively large-amplitude/high frequency torque for producing the desired scan motion without relatively large power requirements;

wherein the experiment is gimbal mounted on the support platform;

auxiliary control system means for controllably positioning said gimbal mounted for producing target acquisition and retention, and for producing complementary motion to the predetermined scan pattern generated with rotation of said unbalanced mass; and wherein said axes of rotation for said drive shafts are perpendicular to the line of sight of the experiment and positioned on opposite sides of the center of gravity of such experiment for producing a predetermined line scan pattern with the experiment line of sight.

19. A process for controllable moving the line of sight of an experiment in a predetermined scan pattern, such experiment being supported on a given support platform, such process including:

providing at least one rotatable unbalanced mass supported on a drive shaft having a fixed axis of rotation relative to and associated with the experiment;

controllably rotating said unbalanced mass about said shaft with a constant angular velocity, so that predetermined reaction forces are brought on the experiment so as to move its line of sight in one of a predetermined, repeating line scan pattern and circular scan pattern, without requiring acceleration or deceleration of said mass, whereby the centrifugal force caused by rotation of said unbalanced mass creates a time-varying relatively large amplitude/high-frequency torque for producing the desired scan motion without relatively large power requirements; and mounting the experiment on the platform with one of a gimbal mount and a fixed mount.

20. A process as in claim 19, wherein the given support platform comprises a free-flying spacecraft, and wherein said drive shaft is supported relative to the experiment such that said drive shaft fixed axis of rotation is parallel with the line of sight of the experiment so as to generate a predetermined circular scan pattern for such line of sight.

21. A process as in claim 19, wherein the given support platform comprises a free-flying spacecraft, and wherein said drive shaft is supported relative to the experiment such that said drive shaft fixed axis of rotation is perpendicular with the line of sight of the experiment so as to generate a predetermined line scan pattern for such line of sight.

22. A process as in claim 19, further including generating a resulting raster scan pattern by selectively stepping the line scan pattern produced with said rotation of said unbalanced mass.

23. A process as in claim 19, further including gimbal mounting the experiment on the given support platform and controllably positioning said gimbal mount for producing target acquisition and retention, and for producing complementary motion to the predetermined scan pattern generated with rotation of said unbalanced mass.

24. A process as in claim 23, further including gimbal mounting the experiment on a space platform like a space shuttle or space station, with the fixed axis of rotation of said drive shaft in a plane parallel with the experiment line of sight, and in a line perpendicular with such line of sight, so that a resulting predetermined line scan pattern of such line of sight is produced by rotation of said unbalanced mass.

25. A process as in claim 24, further including selectively stepping the position of said experiment relative said space platform like a space shuttle or space station so as to form a raster scan pattern from said line scan pattern.

26. A process as in claim 23, wherein said gimbal mount includes two mutually perpendicular and intersecting axes of rotation for angular movement in two directions, and said process includes controlling the position of said gimbal mount in such two directions.

27. A process as in claim 19, wherein said rotatable unbalanced mass comprises a mass member connected with said drive shaft through a lever arm substantially perpendicular thereto, and said process further includes adjusting said lever arm for relative movement of said mass member towards or away from said drive shaft during rotation thereof, so that a spiral scan pattern may be generated.

28. A process as in claim 19, further including varying the position of the center of mass of said rotatable unbalanced mass relative said drive shaft axis of rotation, so that the radius of circular scan patterns and the amplitude of line scan patterns is correspondingly varied.

29. A process as in claim 28, wherein said rotatable unbalanced mass includes a mass member supported on the end of a lever arm, and said process includes repositioning said lever arm relative said drive shaft.

30. A process as in claim 19, further including controlling said drive shaft speed of rotation, wherein the period of rotation for said rotatable unbalanced mass directly determines the period of said repeating scan pattern.

31. A process as in claim 19, further including:

providing a second rotatable unbalanced mass supported on a drive shaft having a fixed axis of rotation relative to and associated with the experiment, and controllably rotating said second unbalanced mass; and controlling rotation of said respective drive shafts so they are driven at the same constant angular velocity while their relative angular positions are maintained such that a predetermined angular separation is established between the respective centers of mass of said rotatable unbalanced masses.

32. A process as in claim 31, wherein said predetermined angular separation is 180 degrees.

33. A process as in claim 31, wherein said predetermined angular separation is 0 degrees.

34. A process for controllable moving the line of sight of an experiment in a predetermined scan pattern, such experiment being supported on a given support platform, such process including:

providing a first rotatable unbalanced mass supported on a drive shaft having a fixed axis of rotation relative to and associated with the experiment;

controllably rotating said unbalanced mass about said shaft with a constant angular velocity, so that predetermined reaction forces are brought on the experiment so as to move its line of sight in a predetermined, repeating scan pattern, without requiring acceleration or deceleration of said mass, whereby the centrifugal force caused by rotation of said unbalanced mass creates a time-varying relatively large amplitude/high-frequency torque for producing the desired scan motion without relatively large power requirements;

gimbal mounting the experiment on the support platform in two mutually perpendicular and intersecting axes of rotation for angular movement in two directions, and controllably positioning said gimbal mount for producing target acquisition and retention, and for producing complementary motion to the predetermined scan pattern generated with rotation of said unbalanced mass, and providing a second rotatable unbalanced mass supported on a drive shaft, and controllably rotating same with a constant angular velocity, with the axes of rotation for said drive shafts parallel to the line of sight of the experiment and positioned on opposite sides of the center of gravity of such experiment, to produce a predetermined circular scan pattern with the experiment line of sight.

35. A process for controllable moving the line of sight of an experiment in a predetermined scan pattern, such experiment being supported on a given support platform, such process including:

providing a first rotatable unbalanced mass supported on a drive shaft having a fixed axis of rotation to and associated with the experiment;

controllably rotating said unbalanced mass about said shaft with a constant angular velocity, so that predetermined reaction forces are brought on the experiment so as to move its line of sight in a predetermined, repeating scan pattern, without requiring acceleration or deceleration of said mass, whereby the centrifugal force caused by rotation of said unbalanced mass creates a time-varying relatively large amplitude/high-frequency torque for producing the desired scan motion without relatively large power requirements;

gimbal mounting the experiment on a balloon in two mutually perpendicular and intersecting axes of rotation for angular movement in two direction, and controllably positioning said gimbal mount for producing target acquisition and retention, and for producing complementary motion to the predetermined scan pattern generated with rotation of said unbalanced mass, and providing a second rotatable unbalanced mass supported on a drive shaft, and controllably rotating same with a constant angular velocity, with the axes of rotation for said drive shafts perpendicular to the line of sight of the experiment and positioned on opposite sides of the center of gravity of such experiment, to produce a predetermined line scan pattern with the experiment line of sight.

36. A process as in claim 35, further including selectively stepping the position of said experiment relative said balloon so as to form a raster scan pattern from said line scan pattern.

* * * * *